US007375624B2

(12) United States Patent
Hines et al.

(10) Patent No.: US 7,375,624 B2
(45) Date of Patent: May 20, 2008

(54) TELEMATIC PARAMETRIC SPEED METERING SYSTEM

(75) Inventors: Jeffrey S. Hines, Wake Forest, NC (US); Mohammad Peyravian, Cary, NC (US); Ravinder K. Sabhikhi, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 11/393,143

(22) Filed: Mar. 30, 2006

(65) Prior Publication Data

US 2007/0236342 A1 Oct. 11, 2007

(51) Int. Cl.
*B60Q 1/00* (2006.01)

(52) U.S. Cl. ...................... 340/438; 340/441; 340/905; 340/936; 701/70; 701/93; 701/119

(58) Field of Classification Search ................ 340/438, 340/936, 905, 901, 902, 903, 996, 441; 701/70, 701/93, 117, 119, 200; 180/65.2, 423
See application file for complete search history.

(56) References Cited

U.S. PATENT DOCUMENTS 5,485,161 A * 1/1996 Vaughn ................. 342/357.13
5,819,198 A * 10/1998 Peretz ........................ 701/117
5,952,941 A * 9/1999 Mardirossian .............. 340/936
6,265,989 B1 * 7/2001 Taylor ........................ 340/901
6,462,675 B1 * 10/2002 Humphrey et al. ......... 340/905
6,845,317 B2 * 1/2005 Craine ........................ 701/200

* cited by examiner

*Primary Examiner*—Toan N. Pham
(74) *Attorney, Agent, or Firm*—Patterson & Sheridan, LLP

(57) ABSTRACT

Embodiments of the present invention provide systems, articles of manufacture and methods for a telematic parametric speed metering system. In one embodiment, a system may determine a vehicle's location and speed. Once the location has been determined, corresponding geographical zone based speed limits and/or other information may be acquired via internal memory or data transmission. The speed of the vehicle may then be compared against the speed limits for the zone. If the vehicle's speed exceeds those speed limits, one or more of a plurality of actions may be performed including (but not limited to) warning the driver via a visual or audio signal, informing an authority agency via data transmission, logging the excessive speeding condition (e.g., time, date, speed, location, driver name, etc).

16 Claims, 8 Drawing Sheets

100

300

| ZONE (302) | GPS COORDINATES (304) | GREEN SPEED LIMIT (306) | YELLOW SPEED LIMIT (308) | RED SPEED LIMIT (310) | YELLOW TOKEN REWARD (312) | RED TOKEN REWARD (314) | ... |
|---|---|---|---|---|---|---|---|
| 332 A | $RANGE_A$ | $G_A$ MPH | $Y_A$ MPH | $R_A$ MPH | YT $REWARD_A$ | RT $REWARD_A$ | ... |
| 334 B | $RANGE_B$ | $G_B$ MPH | $Y_B$ MPH | $R_B$ MPH | YT $REWARD_B$ | RT $REWARD_B$ | ... |
| ⋮ | ⋮ | ⋮ | ⋮ | ⋮ | ⋮ | ⋮ | |

| ... | YELLOW TOKEN LIMIT (316) | RED TOKEN LIMIT (318) | YELLOW WARNING LIMIT (320) | RED WARNING LIMIT (322) | SAMPLING PERIOD (328) | AUTHORITY AGENCY BACKEND (330) |
|---|---|---|---|---|---|---|
| ... | YT $LIMIT_A$ | RT $LIMIT_A$ | YW $LIMIT_A$ | RW $LIMIT_A$ | $P_A$ | $AB_A$ 332 |
| ... | YT $LIMIT_B$ | RT $LIMIT_B$ | YW $LIMIT_B$ | RW $LIMIT_B$ | $P_B$ | $AB_B$ 334 |
| | ⋮ | ⋮ | ⋮ | ⋮ | ⋮ | ⋮ |

*FIG. 3*

TELEMATIC PARAMETRIC SPEED METERING SYSTEM

BACKGROUND OF THE INVENTION

1. Field of the Invention

The invention generally relates to the field of vehicle monitoring and vehicle statistics reporting.

2. Description of the Related Art

In order to provide a safe environment on and surrounding roads, governmental entities (e.g., countries, states, cities, municipalities, etc.) may implement speed limits. The speed limits may be determined in regards to the conditions of the roadway or the adjacent surroundings. Speed limits are implemented with the hope that drivers will drive at or below the posted speeds. However, at times individuals, whether intentionally or unintentionally, do violate speed limits. Violation of speed limits creates hazardous and even deadly situations for the driver, other vehicles, and/or pedestrians on the same or adjacent roadways.

While speeding in a motor vehicle may be an intentional act, it is often unintentional. In many modern cars superior suspension and noise cancellation techniques eliminate common passive speed indicators, thereby leading individuals to inadvertently exceed the speed limit. In this case, the only way a driver knows whether they are speeding is by checking the readout on their speedometer and comparing it to the speed limit signs posted by governmental entities.

Government entities have done several things to try and deter speeding. Speed limit signs have been erected to inform individuals of the speed limits in certain areas. However, signs often do little to deter violations of speed limits. Government entities have also deployed law enforcement officers to monitor vehicle speeds, stop individuals violating speed limits, and issue citations to individuals violating the speed limits. Government entities have also attempted to halt speeding by placing "road bumps" or "speed bumps" in roadways. However, these attempts to control speed have limited effectiveness by virtue of being intermittent or passive (such as signs, which can often be ignored or overlooked without any ramifications to the driver).

Furthermore, changes in speed limits for a certain area may confuse drivers. For example, speed limits for a certain geographical area may be one speed limit during the day and a different speed limit during the night. Additionally, school zones have different speed limits during school hours than during non-school hours. Due to these different speed limits according to different times of the day or different areas, a substantial responsibility is placed on the driver to remain vigilant at all times. Inevitability, however, drivers' concentration or judgment will lapse, resulting in speeding violations.

Therefore, a need exists for a way to monitor and/or control vehicular speed.

SUMMARY OF THE INVENTION

The present invention generally provides systems, methods, and articles of manufacture to monitor and/or control vehicular speed.

One embodiment provides a method for monitoring a speed of a vehicle. The method generally comprises determining a location of the vehicle; retrieving one or more geographically specific speed-monitoring parameters corresponding to the determined location of the vehicle; wherein the speed-monitoring parameters are retrieved from a database containing a plurality of geographically specific speed-monitoring parameters each corresponding to different geographic locations, and wherein the plurality of speed-monitoring parameters are user-configurable; determining a speed of the vehicle; and on the basis of the retrieved speed-monitoring parameters and the determined speed of the vehicle, adjusting one or more token values according to a credit/debit system in which the one or more token values are increased if the determined speed is less than a first predefined speed threshold and decreased if the determined speed is greater than the first predetermined speed threshold, and wherein the one or more token values are applied to mitigate a likelihood that an excessive speed warning is issued.

Another embodiment provides a method for monitoring a speed of a vehicle. The method generally comprises determining a location of the vehicle; retrieving one or more geographically specific speed-monitoring parameters corresponding to the determined location of the vehicle; wherein the speed-monitoring parameters are retrieved from a database containing a plurality of geographically specific speed-monitoring parameters each corresponding to different geographic locations, and wherein the plurality of speed-monitoring parameters are user-configurable; determining a speed of the vehicle; and on the basis of the retrieved speed-monitoring parameters and the determined speed of the vehicle: increasing one or more token values each corresponding to a distinct speed range if the determined speed is less than a first predefined threshold and if each token value is less than a predefined token value limit for the respective token, wherein the predefined token value limits are included with the retrieved speed-monitoring parameters; decreasing the token value corresponding to the respective speed range if the determined speed is within the respective speed range and the token value is greater than the determined speed of the vehicle; increasing one or more warning values corresponding to the respective speed range if the respective token value is less than the determined speed of the vehicle; and issuing a notification if the one or more warning values is greater than one or more predefined warning value limits, wherein the predefined warning value limits are included with the retrieved speed-monitoring parameters.

Another embodiment provides a computer readable medium containing a program. The program, when executed, performs an operation, comprising: determining a location of a vehicle; retrieving one or more geographically specific speed-monitoring parameters corresponding to the determined location of the vehicle; wherein the speed-monitoring parameters are retrieved from a database containing a plurality of geographically specific speed-monitoring parameters each corresponding to different geographic locations, and wherein the plurality of speed-monitoring parameters are user-configurable; determining a speed of the vehicle; and on the basis of the retrieved speed-monitoring parameters and the determined speed of the vehicle, adjusting one or more token values according to a credit/debit system in which the one or more token values are increased if the determined speed is less than a first predefined speed threshold and decreased if the determined speed is greater than the first predetermined speed threshold, and wherein the one or more token values are applied to mitigate a likelihood that an excessive speed warning is issued.

Another embodiment provides an apparatus for monitoring a speed of a vehicle. The apparatus generally comprises memory for holding a vehicle speed monitoring program and a processor. The processor is configured to execute the speed monitoring program comprising the steps of: determining a location of the vehicle; retrieving one or more geographically specific speed-monitoring parameters corresponding to the determined location of the vehicle; wherein the speed-monitoring parameters are retrieved from a database containing a plurality of geographically specific speed-monitoring parameters each corresponding to different geographic locations, and wherein the plurality of speed-monitoring parameters are user-configurable; determining a speed of the vehicle; and on the basis of the retrieved speed-monitoring parameters and the determined speed of the vehicle: increasing one or more token values each corresponding to a distinct speed range if the determined speed is less than a first predefined threshold and if each token value is less than a predefined token value limit for the respective token, wherein the predefined token value limits are included with the retrieved speed-monitoring parameters; decreasing the token value corresponding to the respective speed range if the determined speed is within the respective speed range and the token value is greater than the determined speed of the vehicle; increasing one or more warning values corresponding to the respective speed range if the respective token value is less than the determined speed of the vehicle; and issuing a notification if the one or more warning values is greater than one or more predefined warning value limits, wherein the predefined warning value limits are included with the retrieved speed-monitoring parameters.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is an exemplary database containing geographical zone-related speed information, according to one embodiment of the invention.

DETAILED DESCRIPTION OF THE PREFERRED EMBODIMENTS

Figure 1:
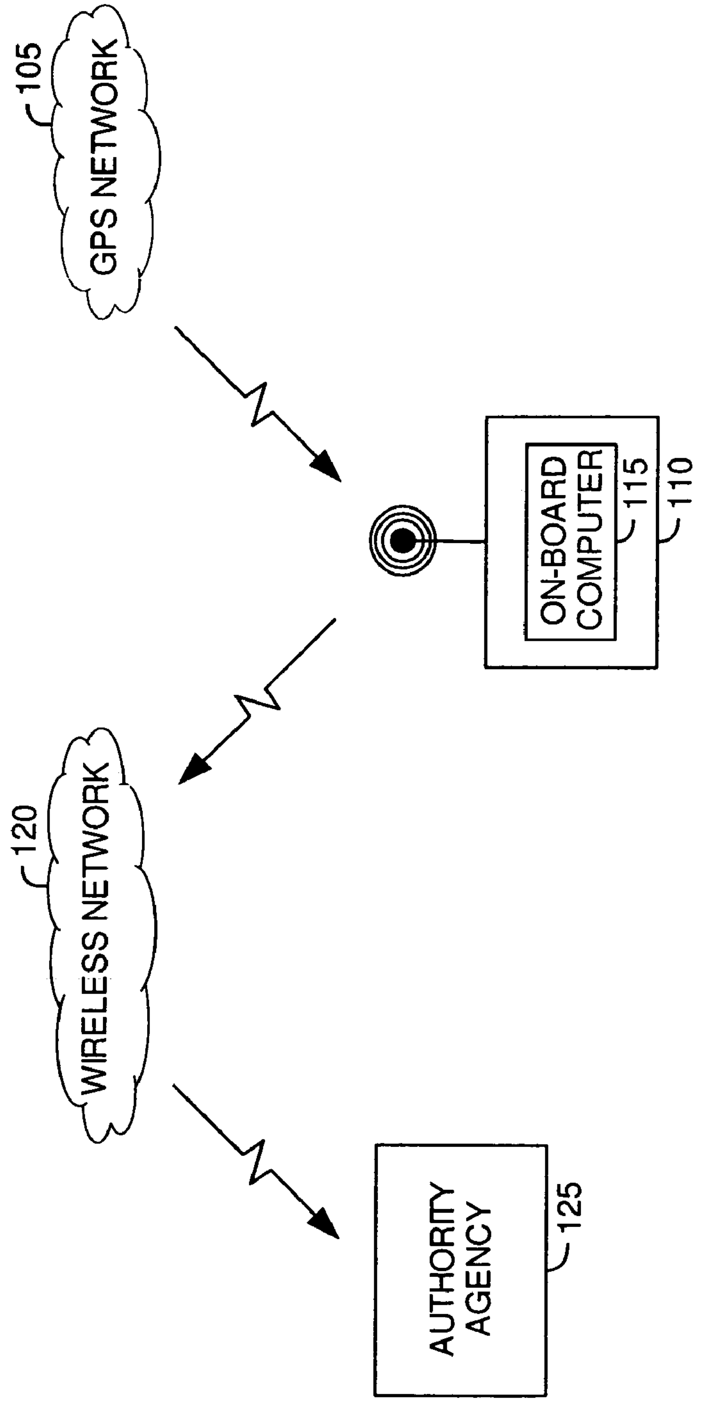
FIG. 1 is a block diagram illustrating an exemplary vehicle speed monitoring and reporting communications environment, according to one embodiment of the invention.

Embodiments of the present invention provide systems, articles of manufacture and methods for a telematic parametric speed metering system. In one embodiment, a system may determine a vehicle's location and speed. Once the location has been determined, corresponding geographical zone based speed limits and/or other information may be acquired via internal memory or data transmission. The speed of the vehicle may then be compared against the speed limits for the zone. If the vehicle's speed exceeds those speed limits, one or more of a plurality of actions may be performed including (but not limited to) warning the driver via a visual or audio signal, informing an authority agency via data transmission, logging the excessive speeding condition (e.g., time, date, speed, location, driver name, etc). By way of illustration only, embodiments of the invention will be described with respect to Global Positioning Systems. However, any location determining technology is contemplated including GPS-assisted technology and non-GPS technology.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the computer system shown in FIG. 2 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer or CD-ROM disks readable by a CD-ROM drive); (ii) alterable information stored on writable storage media (e.g., read-write memory devices within a computer or CD-RW disks readable/writable by a CD-RW drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature. Further, some or all of the functionality of the present embodiments may be implemented in hardware.

Exemplary Systems

FIG. 1 is a block diagram illustrating an exemplary telematic GPS-based parametric speed metering communications environment 100, according to one embodiment of the invention. The communications environment 100 may include a vehicle 110. For example, as shown here the vehicle 110 may be an automobile. It should be appreciated, however, that the vehicle 110 may be a boat, a motorcycle, an aircraft or any other vehicle to which speed regulations may apply. The communications environment 100 may use a location-determining device to determine the vehicle's location. Illustratively, the system is shown using a Global Positioning System (GPS) 105. The communications environment 100 may also include a wireless communication network 125. This wireless network 125 may be any wireless communication network capable of transmitting and sending data wirelessly (e.g., GSM, GPRS, SMS, etc.). The communications environment 100 may also include an authority agency 125. The authority agency 125 may define geographical zones, implement speed related regulations, and carry out post speeding event related procedures. The authority agency may communicate with the on-board computer 115. Exemplary communications may include sending updated geographic zone definitions and speed related regulations to the on-board computer 115, and receiving communications from the on-board computer 115 related to the speed of the vehicle 110. Exemplary authority agencies 125 may consist of police stations or third party service providers.

Within or on the vehicle 110, the communications environment 100 may include an on-board computer 115. The on-board computer 115, further described with reference to FIG. 2, may consist of the necessary components to receive GPS signals from the GPS system 105 The on-board computer 115 may use the GPS 105 signals to calculate the geographic location, or coordinates, of the vehicle 110. The on-board computer 115 may then use the acquired coordinates to determine which predefined geographical zone the vehicle 110 is located in. The geographic zone may be any area defined by GPS coordinates. The geographical zone may consist of predefined area along a road, a street or encompassing a neighborhood, a city, or any other geographical region or area. Exemplary geographical zones are illustrated below with reference to FIG. 4. The on-board computer 115 may also determine the speed related regulations for the geographic zone within which the vehicle 110 is located.

The speed related regulations for the geographic zone may be stored locally within the on-board computer 115 or downloaded from an authority agency 125 or other location using the wireless network 120. Likewise, the information defining the geographic zones may be stored in a database (e.g., with a map database) locally with the on-board computer 115 or downloaded from an authority agency 125 or other location using the wireless network 120. In the case of downloading the speed related regulations and/or geographic zones, it is contemplated that the downloading may be initiated upon entering or approaching predefined geographic regions. Once a predefined geographic region is exited, the corresponding stored data may be disposed of. In this way, up-to-date data is regularly being downloaded from a source (e.g., the agency 125) and ensures that the on-board computer 115 always has access to the most current information. However, it is also contemplated that a local database or databases are maintained on the vehicle 110 and are accessible to, or are part of, the on-board computer 115. The databases may be updated periodically, e.g., monthly or as changes to the data are made.

The on-board computer 115 may also use the GPS signals to determine the speed at which the vehicle 110 is traveling. For example, the speed may be calculated by determining the change in the location of the vehicle 110 over time. The speed may alternatively be determined by the on-board computer 115 using a speedometer of the vehicle 110.

In one embodiment, the computer 115 uses the determined zone and speed information to determine whether a driver is currently exceeding a prescribed speed limit for the zone in which the vehicle is located. Speeding violations may be determined by comparing the current speed of the vehicle 110 to the speed related regulations for the geographic zone in which the vehicle 110 is located. As will be described in more detail below, some embodiments of the present invention implement credit/debit algorithms that reward a driver for maintaining a predefined permitted speed with a predefined zone and penalize the driver for exceeding the predefined permitted speed with the predefined zone. In this manner, the rewards earned by a driver may be used to offset the penalties and thereby mitigate some action (e.g., reporting action) being taken by on-board computer 115. Upon the occurrence of appropriate events (e.g., the vehicle traveling faster than the established speed limit for the zone for a sufficient period of time), the on-board computer 115 may take one of a plurality of actions. For example, in one embodiment the on-board computer 115 may report the speeding violation to the authority agency 125 over the wireless network 120. Additionally or alternatively, the on-board computer 115 may log the speeding violation in an on-board database. The logged information may include the time, date, speed, location, driver name, etc. Additional functionality of the on-board computer 115 may be to warn the driver of the vehicle 110 of possible speeding violations.

Figure 2:
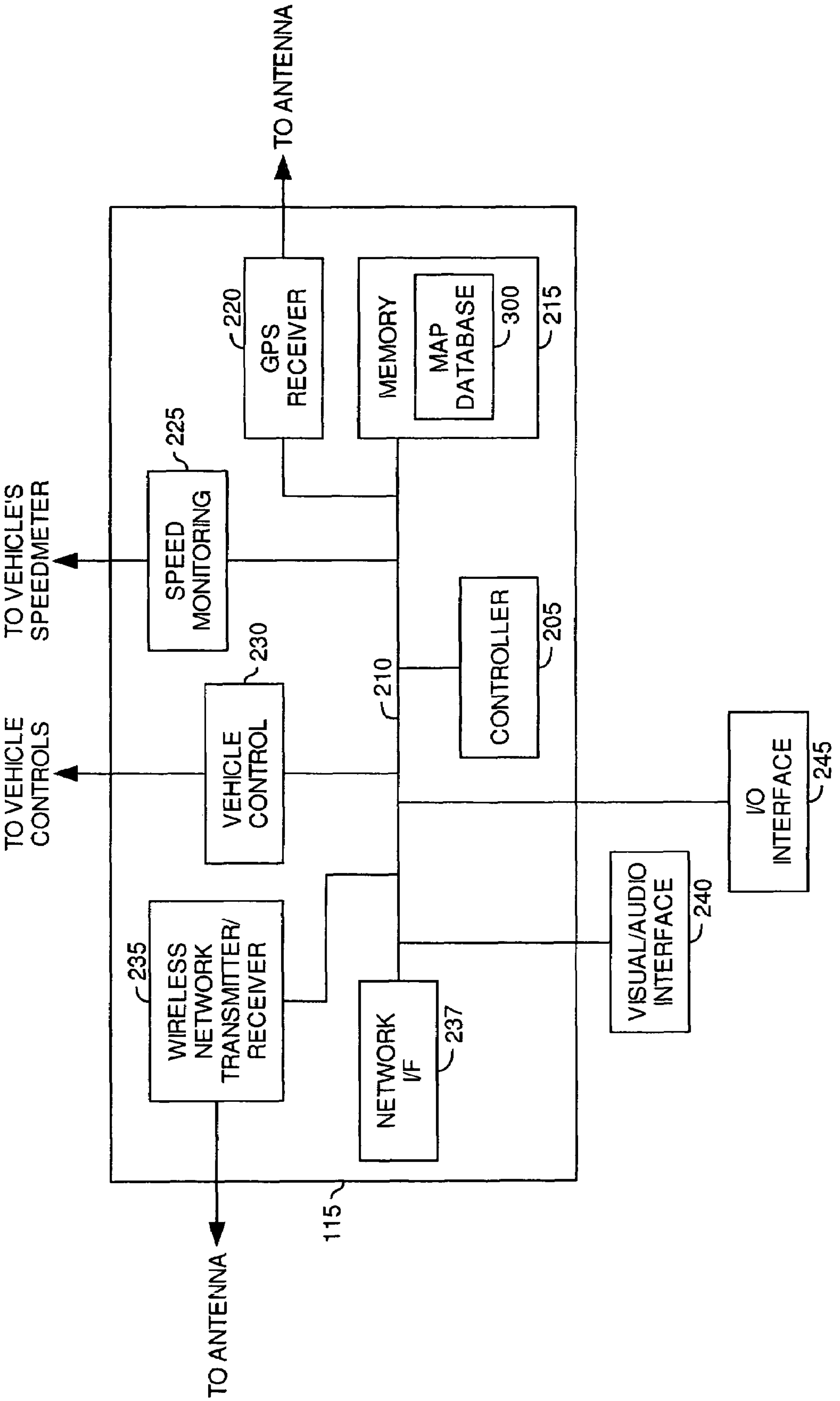
FIG. 2 is a block diagram illustrating an exemplary on-board computer 115, according to one embodiment of the invention.

FIG. 2 is a block diagram illustrating an exemplary on-board computer 115 as described with reference to FIG. 1, according to one embodiment of the invention. The on-board computer 115 may have a controller 205 within which processing tasks may take place to implement the functions of the present embodiments. The system may also contain memory 215. While memory 215 is shown as a single entity, it should be understood that the memory 215 may in fact comprise a plurality of modules. The memory 215 may be made up of any combination of random access memory (RAM), read only memory (ROM), hard disks, or the like. Memory 215 may contain an operating system and other programs which may control the function of the on-board computer.

Interconnecting the controller 205, memory 215 and other subsystems of the on-board computer 115 may be a bus 210. The on-board computer 115 may also contain an I/O interface 245 connected to the bus 210. The I/O interface 245 may be a mouse, a keyboard, a touchpad, a microphone (e.g., where the on-board computer 115 includes voice-command capability) or any other suitable device to input information into the on-board computer 115. The onboard monitor may also employ a visual and/or audio interface 240 to output information from the on-board computer to the driver of the vehicle 110. The visual or audio interface 240 may be used to warn the driver of the vehicle 110 of speed related violations. Alternatively, the visual and/or audio interface 240 and the I/O interface 245 may be contained within one device such as a touch screen. It should be appreciated by those skilled in the art that any suitable device for I/O operations could be used for either the I/O interface 245 or the visual or audio interface 240.

Also connected to the bus 210 may be several network devices. The network interface devices may be any entry/exit device configured to allow network communications between the on-board computer 115 and the devices connected to the network. For example, the network interface device may be a network interface card 237. Another such network device may be a wireless network transmitter and receiver 235 to communicate with the wireless network 120. The wireless network transmitter and receiver 235 may be connected to an antenna to enhance transmission and reception of signals on the wireless network 120.

The on-board computer 115 may also contain vehicle control logic 230 which may interact with systems within the vehicle 110. One such system the vehicle control logic 230 may interact with in the vehicle may be the power system (e.g., engine) or the ignition system of the vehicle 110. For example, prior to enabling the ignition system the on-board computer 115 may require a driver to login, whereby the identity of the driver can be established with a sufficient degree of certainty.

The on-board computer 115 may also contain a GPS receiver 220. The GPS receiver 220 may receive GPS signals sent from the GPS network 105. The GPS receiver may be connected to an antenna in order to enhance the reception of GPS signals. The GPS receiver 220 may be used to calculate the location of the vehicle 110 and calculate the speed of the vehicle 110. Alternatively or additionally, the speed of the vehicle may be determined using speed monitoring logic 225 of the on-board computer 115. In one embodiment, the speed monitoring logic 225 may be connected to the speedometer of the vehicle 110 in order to receive signals representative of a current speed from the speedometer.

FIG. 3 is an exemplary database 300 containing geographical zone-related information, according to one embodiment of the invention. In one embodiment of the invention, the database 300 may be initially contained within the memory 215 of the on-board computer 115. In yet another embodiment of the invention, the database may initially be downloaded 300 from the wireless network 120 when the location of the vehicle 110 has been determined by the on-board computer 115.

According to one embodiment of the invention, the database 300 may contain variable information related to the geographical location of the vehicle 110. The database may separate geographical zone related speed information by separating the different geographical zones into individual rows. For example, zone A and zone B are illustrated as row 332 and row 334 respectively in database 300. Geographically distinct speed limits and related parameters for each zone may be defined in individual columns. For example, the range of GPS coordinates for each zone may be defined in a GPS coordinates column 304. A green speed limit column 306, a yellow speed limit column 308, and a red speed limit column 310 may define different speed limits for the geographical zone within which the vehicle 110 may be traveling.

The database 300 may also contain yellow token reward column 312, a red token reward column 314, a yellow token limit column 316, and a red token limit column 318. The values within the token columns (312, 314, 316, and 318) will be discussed more with reference to FIGS. 7A and 7B. The database may also contain a yellow warning limit column 320 and a red warning limit column 324. The values within the warning limit columns (320 and 324) will also be discussed in more detail with reference to FIGS. 7A and 7B. The database 300 may also contain a sampling period column 328. The value within the sampling period column may specify the time period the on-board computer may wait before determining the location of the vehicle 110, calculate the speed of the vehicle 110, and determine whether or not the driver of the vehicle 110 is speeding. Lastly the database 300 may also contain an authority agency backend column 330 which may specify how the on-board computer 115 may communicate with the authority agency 125.

Figure 4:
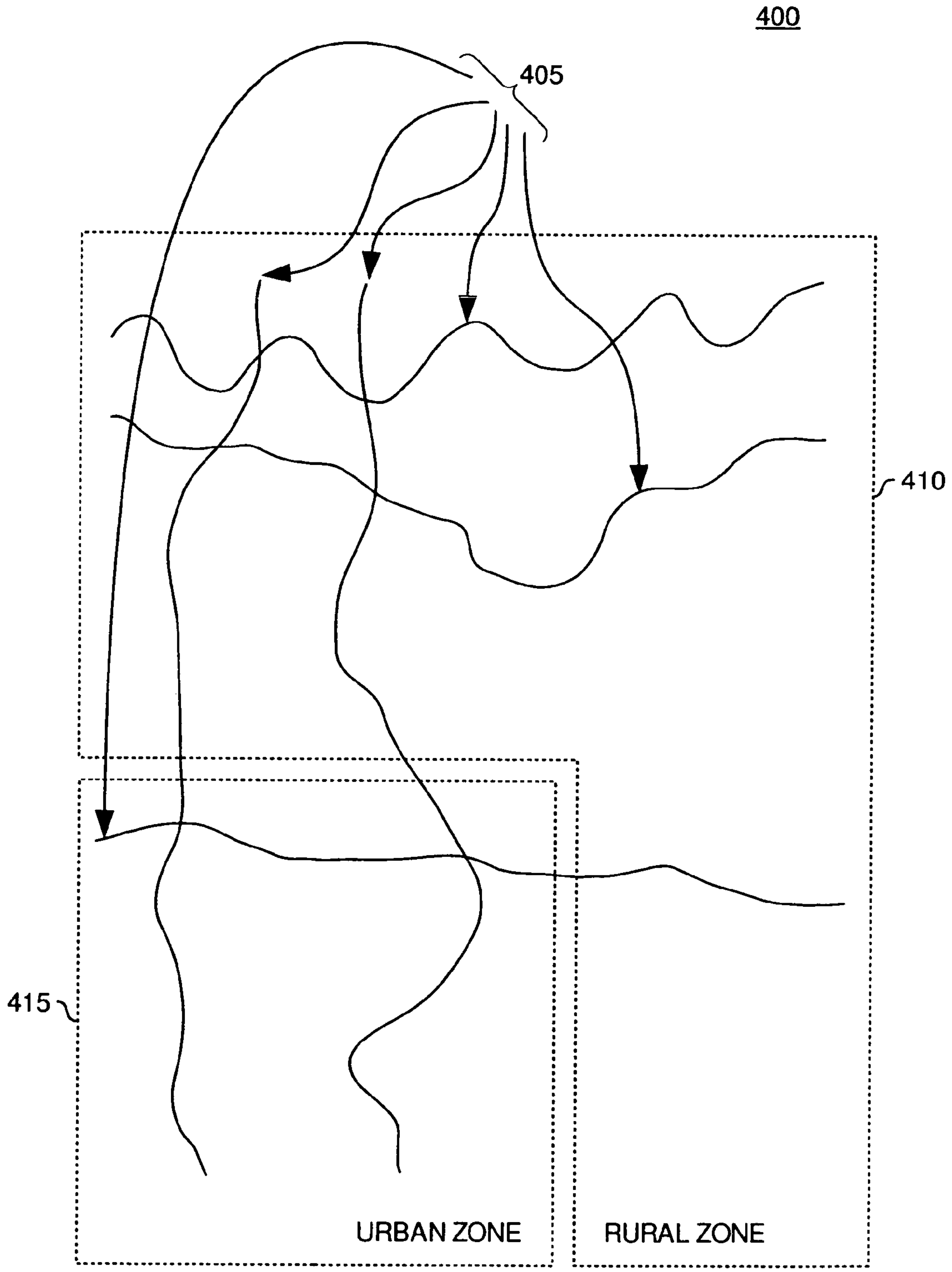
FIG. 4 is a map illustrating exemplary speed regulated geographical zones, according to one embodiment of the invention.

FIG. 4 is a map 400 illustrating exemplary speed regulated geographical zones, according to one embodiment of the invention. The zones may be defined by a range of GPS coordinates specified in a database. For example, in column 304 of the database 300 illustrated in FIG. 3. The GPS coordinate defined borders are represented in FIG. 4 by dotted lines outlining two distinct geographical zones. One type of geographical zone may be a Rural Zone 410. A rural zone may have more rugged geographical features such as mountains or lakes. Consequently, a rural zone may have speed limits that are lower to reflect the more dangerous road conditions.

Another type of zone may be an urban zone 415. An urban zone may have a higher population density, schools, residential zones, and other population dense areas. Consequently an urban zone may have lower speed limits to reduce the risk of an accident due to the higher population density. Both zones may have roads 405 which extend from one zone into another. The speed limits specified for each zone may be enacted by the authority agency, governmental agency, or any other legislative body with the power to enact speed limits. The speed limits may be determined with regards to any number of factors including but not limited to the conditions of the roads within the zone, the population surrounding the zones, and the time of day.

Figure 5:
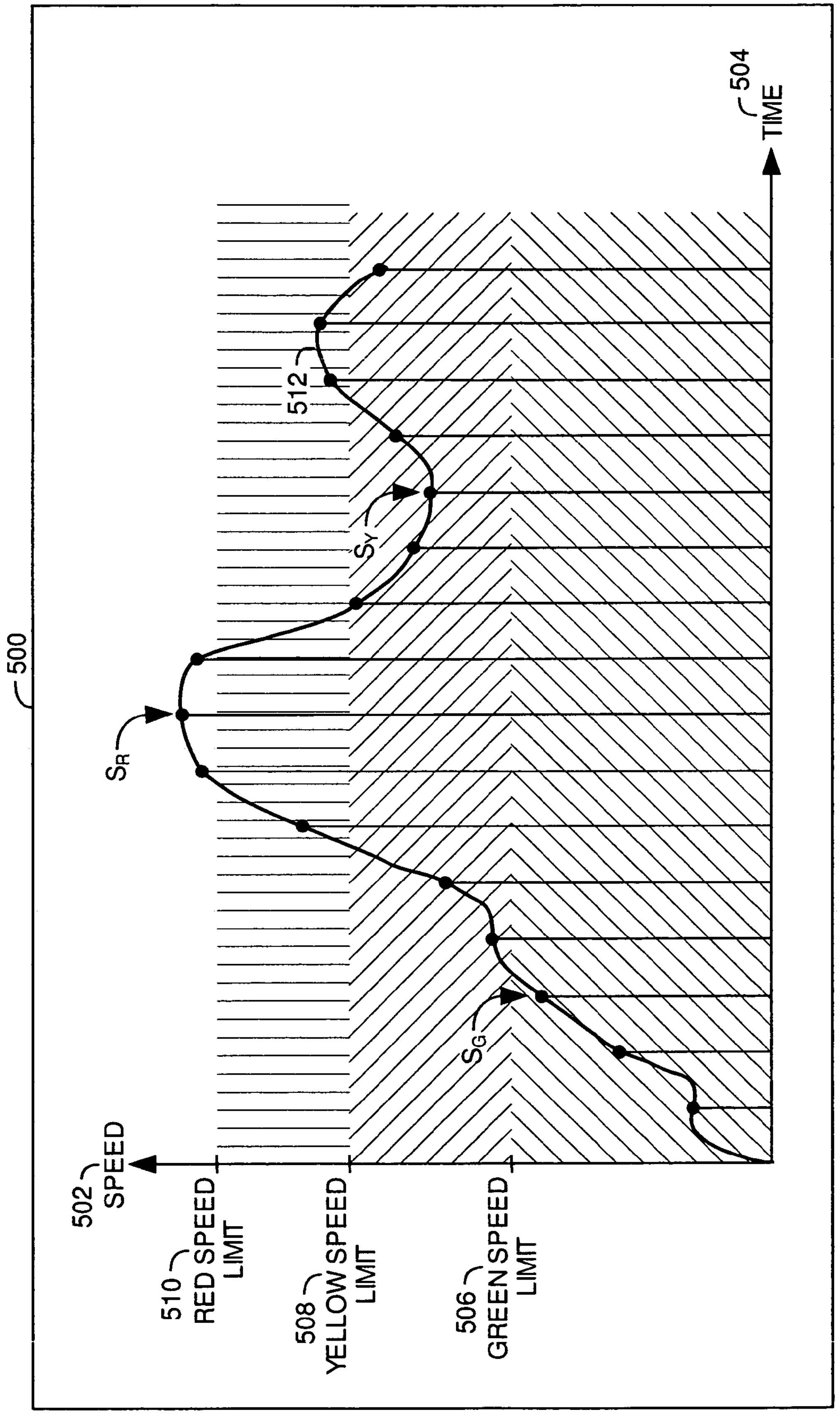
FIG. 5 is a graph illustrating an exemplary vehicle's speed over time, according to one embodiment of the invention.

FIG. 5 is a graph illustrating an exemplary vehicle's speed over time, according to one embodiment of the invention. The graph has a horizontal axis, time 504, and a vertical axis, speed 502. In one embodiment of the invention, the database 300 may specify three threshold speed limits for a particular geographical zone. For example, a green speed limit, a yellow speed limit, and a red speed limit may be specified. The green speed limit 506, yellow speed limit 508, and red speed limit 510 are depicted on the graph as horizontal lines extending across the graph at different vertical heights.

The curved line 512 between the time axis 504 and the speed axis 502 represents the vehicle 110 speed. The vehicle speed line 512 depicts the change in speed of a vehicle with an on-board computer over time. The points spaced evenly along the vehicle speed line 512, separated evenly by a distance P, represent the vehicle's speed at specific points in time. The points are spaced according to the sample rate of the on-board computer, P. The sample period, P, may be determined by checking the database 300 stored either within the on-board computer memory 215 or downloaded from the authority agency 125. Exemplary sampling periods may be in the order of seconds (e.g., 1, 2, 3, etc.).

A vehicle's speed may change over time as is depicted in the changes in location along the y-axis of the various points along the vehicle speed line 512. The gradual upward trending slope of the vehicle speed line 512, from point $S_G$ to point $S_R$ illustrates an increase in the speed of the vehicle 110 (i.e. an acceleration of the vehicle 110). The gradual downward trending slope of the vehicle speed line 512, from point $S_R$ to point $S_Y$, illustrates a decrease in the speed of the vehicle 110 (i.e. a deceleration of the vehicle 110).

When the on-board computer 115 samples the speed of the vehicle 110 at point $S_G$, the on-board computer 115 may determine that the speed $S_G$ is less than the green speed limit 506 set by the authority agency 125. In this scenario the on-board computer 115 may do nothing, or it may reward the driver of the vehicle 110. At a later point in time, the on-board computer 115 may sample the speed of the vehicle 110 at a point in time $S_R$. The on-board computer 115 may determine that the speed $S_R$ is greater than the red speed limit 510 set by the authority agency 125. The on-board computer 115 may then issue a warning to the driver of the vehicle 110 and/or may report the speeding driver along with any other pertinent information (e.g., vehicle identification, speed traveling, etc.) to the authority agency 125. This scenario is further described with reference to FIGS. 7A and 7B.

At another point in time, the on-board computer 115 may sample the speed of the vehicle 110 at a point in time $S_Y$. The on-board computer 115 may determine that the speed, $S_Y$, is greater than the green speed limit 508, but less than the yellow speed limit 508. The on-board computer 115 may then issue a warning to the driver of the vehicle 110 and/or report the driver, the vehicle 110, the speed of the vehicle 110 or any other pertinent information to the authority agency 125. This scenario is also further described with reference to FIGS. 7A and 7B.

Exemplary Operations

Figure 6:
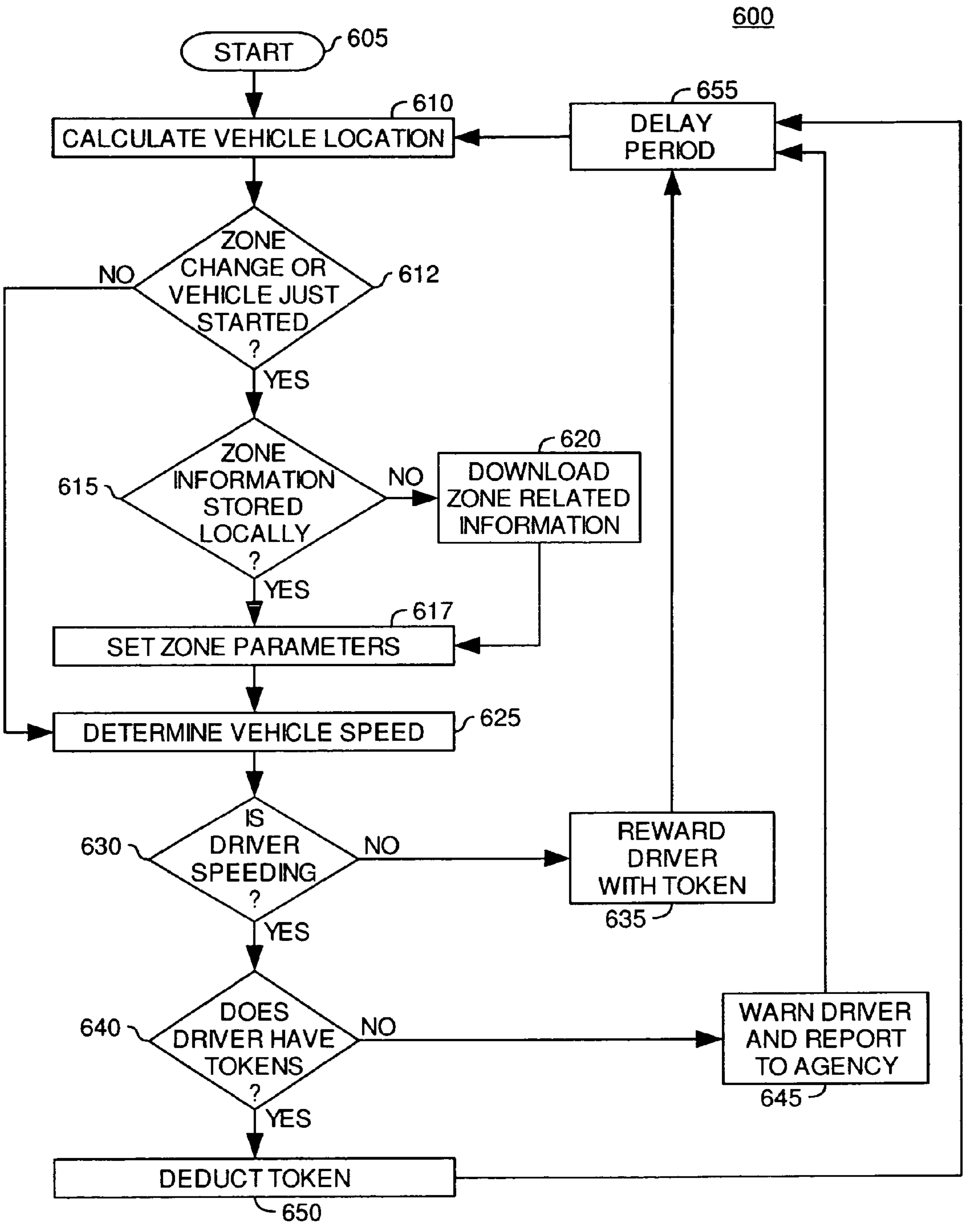
FIGS. 6, 7A and 7B are flowcharts illustrating methods of determining vehicle location, vehicle speed, violations of speed limits, and reporting violations of speed limits to an authority agency, according to embodiments of the invention.

FIG. 6 is a flowchart illustrating a method 600 performed by the on-board computer 115 to determine vehicle 110 location, vehicle 110 speed, violations of speed limits, and to report violations of speed limits to an authority agency 125, according to one embodiment of the invention. The method 600 may begin at step 605 when the on-board computer 115 is turned on. This may occur when the ignition of the vehicle 110 is turned to the on position. At step 610, the on-board computer 115 may initially calculate the location of the vehicle 110.

Next at step 612, the on-board computer 115 may determine if the zone within which the vehicle 110 is located has changed or the vehicle 110 has just been started. If the zone has changed or the vehicle 110 has just been started, the on-board computer 115 may proceed to step 615. If the zone has not changed or the vehicle 110 was not just started then the on-board computer 115 may proceed to step 625 where the vehicle 110 speed will be determined.

At step 615, depending on the location of the vehicle 110 the on-board computer 115 may determine if the zone information for that location is stored locally (e.g., in memory 215). If not, the zone related information (e.g. speed limits, driver tokens, etc.) may be downloaded from an authority agency 125 via a wireless network 120. After the zone information has been downloaded from an authority agency 125, at step 617 the on-board computer 115 may set the zone parameters, such as speed limits and/or driver tokens. After step 617, the on-board computer 115 may proceed to step 625 to determine the speed of the vehicle 110.

Returning to step 615, if the zone information was stored locally, the on-board computer 115 may proceed to step 617 where the zone parameters, such as speed limits and driver tokens may be set. After step 617, the on-board computer 115 may proceed to step 625 to determine the speed of the vehicle 110.

The speed of the vehicle 110 may be determined by checking the speedometer of the vehicle 110, or by using historical GPS location information to calculate the change in distance traveled by the vehicle 110 over time. Regardless of the method used to calculate the speed of the vehicle 110, after the speed has been determined, the on-board computer 115 may determine if the vehicle 110 is speeding at step 630. This determination may be made by comparing the calculated vehicle 110 speed to the zone speed limits set in step 617.

If the driver is not speeding, then the on-board computer 115 may reward the driver with a token or credit at step 635. The token may allow the driver to violate the speed limit for some duration of time without reporting the violation to an authority agency 125.

This reward system takes into consideration the possibility that an individual may be a safe driver, however at times may need to speed to avoid a dangerous condition or some similar necessary reason. Under the assumption that the individual is a safe driver, the communications environment 100 may not penalized them for infrequent speeding. The amount of tokens rewarded may be determined by zone parameters, may correspond to how much slower the vehicle 110 may be traveling below the speed limit, or by any other calculation or definition. After step 635, the on-board computer 115 may proceed to step 655 where the on-board computer 115 may wait for a predefined delay period. This delay period is the same as the delay period described above with respect to FIG. 5. After the on-board computer 115 has waited the delay period at step 655, the on-board computer 115 may again calculate the location of the vehicle 110 in step 610, and perform operations as described above to determine if the driver of the vehicle 110 is exceeding the speed limit or limits.

Returning to step 630, if the on-board computer 115 determines that the driver of the vehicle 110 is speeding, then the on-board computer 115 may proceed to step 640. At step 640, the on-board computer 115 may determine whether or not the driver has been rewarded in the past with any tokens. If so, the on-board computer 115 may proceed to step 650 where a token or tokens may be deducted from the tokens the driver has previously received. The amount of tokens deducted may be determined by zone parameters, may correspond to how much the driver may be exceeding the speed limit, or determined by any other calculation or definition. Additionally, the driver of the vehicle 110 may be notified that tokens have been deducted because the driver of the vehicle 110 is speeding. After the token or tokens have been deducted, the on-board computer 115 may proceed to step 655 where the on-board computer 115 may wait for a predefined period.

If at step 640 the on-board computer 115 determines that the speeding driver does not have any tokens, then the on-board computer 115 may proceed to step 645. At step 645, the on-board computer 115 may warn the driver, via any acceptable manner (e.g., audio signal), that the driver is speeding. Also at step 645, in conjunction with the driver warning or in place of the driver warning, the on-board computer 115 may report the speeding driver along with any other pertinent information (e.g., vehicle identification, speed traveling, etc.) to the authority agency 125 via the wireless network 120. In another embodiment of the invention, the on-board computer 115 may store the warning information locally within the memory 215 of the on-board computer 115 to be downloaded at a later time with the aid of an external device. For example, the information may be downloaded only when the on-board computer 115 comes within range of a particular 802.11 wireless network. This storing and downloading of the warning information may be in place of, or in combination with, immediately reporting the speeding information to the authority agency 125 via the wireless network 120. After the driver has been warned and/or the authority agency 125 informed of the speeding, the on-board computer 115 may proceed to step 655 where it may wait a pre-defined delay period.

Figure 7A:
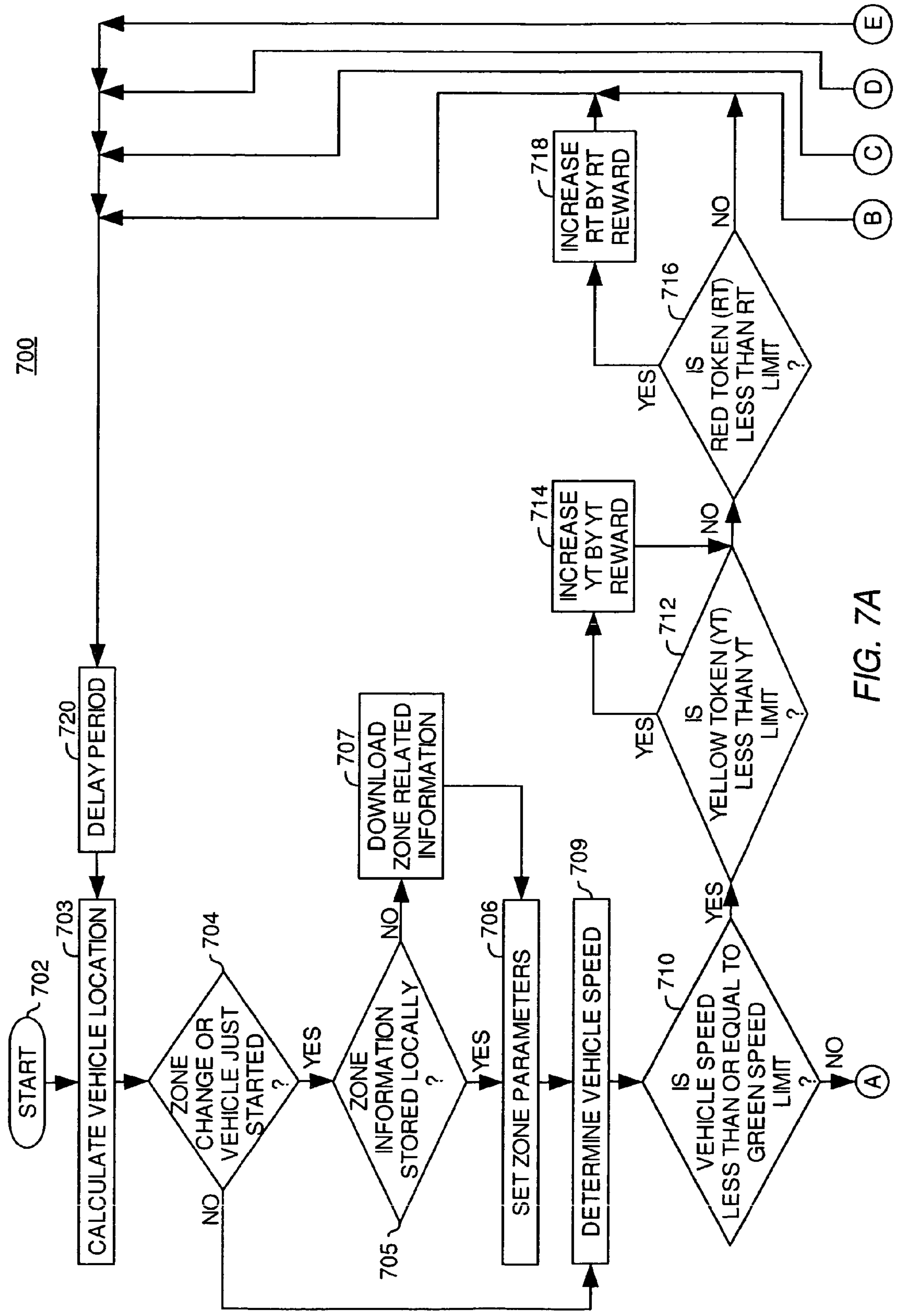
Figure 7B:
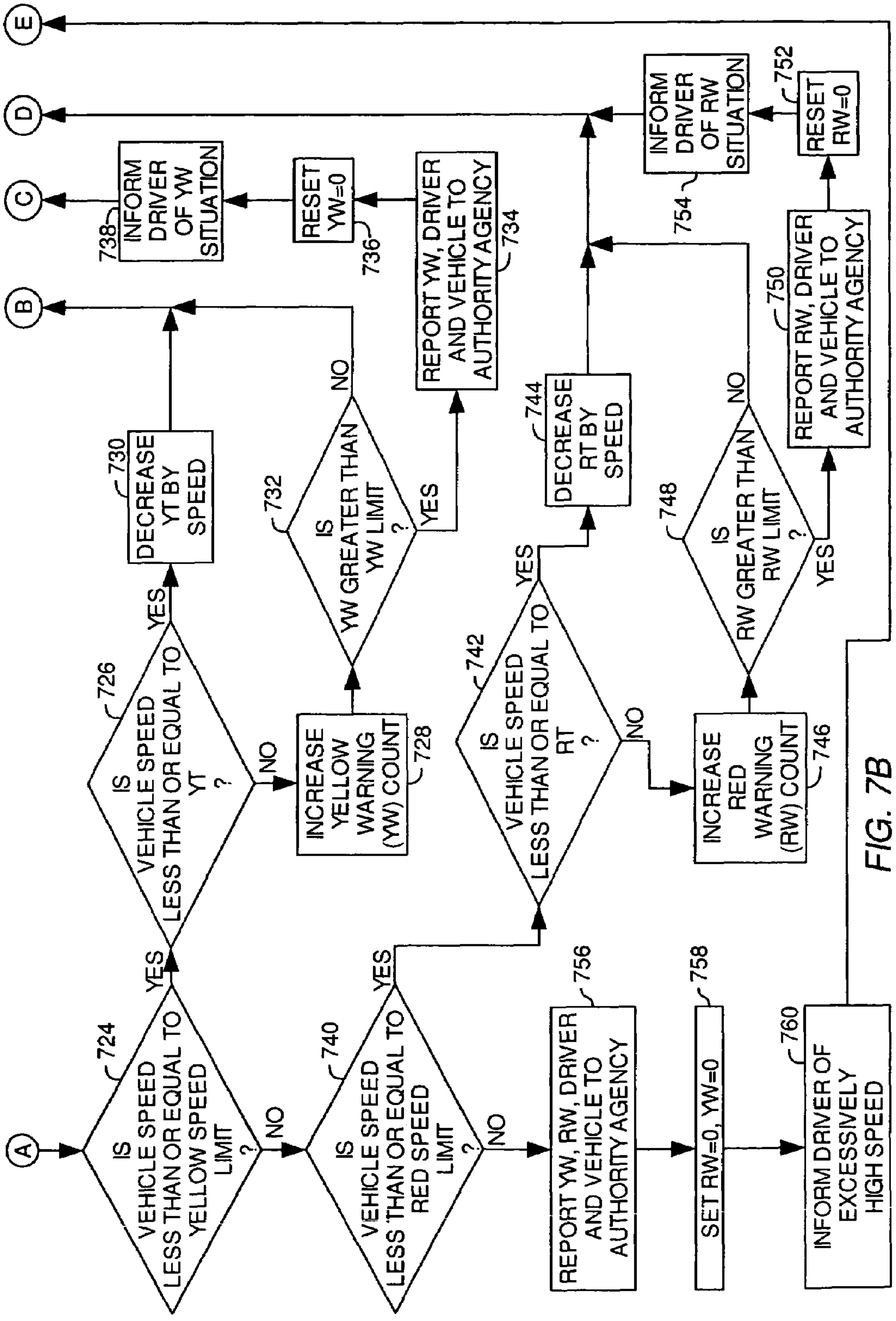

FIGS. 7A and 7B are flowcharts which together illustrate a method 700 of determining vehicle 110 location; vehicle 110 speed, violations of speed limits, and reporting violations of speed limits to an authority agency 125, according to one embodiment of the invention. The method 700 may begin at step 702 when the on-board computer 115 is turned on. This may occur when the ignition of the vehicle 110 is turned on. At step 703, the on-board computer 115 may calculate the location of the vehicle 110.

Next at step 704, the on-board computer 115 may determine if the zone within which the vehicle 110 is located has changed or the vehicle 110 has just been started. If the zone has changed or the vehicle 110 has just been started, the on-board computer 115 may proceed to step 705. If the zone has not changed or the vehicle 110 was not just started then the on-board computer 115 may proceed to step 709 where the vehicle 110 speed may be determined.

At step 705, depending on the location of the vehicle 110 the on-board computer 115 may determine if the zone information for that location is stored locally. If not, at step 707, the zone related information, such as speed limits and/or driver tokens, may be downloaded from an authority agency 125 via a wireless network 120. After the zone information has been downloaded, the on-board computer 115 may set the zone parameters, such as the green speed limit, the yellow speed limit, the red speed limit, the yellow token reward value, the red token reward value, the yellow token limit, the red token limit, the yellow warning limit, the red warning limit, and the sampling period at step 706. After step 706, the on-board computer 115 may proceed to step 709 to determine the speed of the vehicle 110.

Returning to step 705, if the zone information was stored locally, the on-board computer 115 may proceed to step 706 where the zone parameters may be set. After step 706, the on-board computer 115 may proceed to step 709 to determine the speed of the vehicle 110.

The speed of the vehicle 110 may be determined by checking the speedometer of the vehicle 110 or by using historical GPS location information to calculate the change in distance traveled by the vehicle 110 over time. Regardless of the method used to calculate the speed of the vehicle 110, after the speed has been determined, the on-board computer 115 may determine if the vehicle 110 is traveling at a rate less than or equal to the green speed limit at step 710. This determination may be made by comparing the vehicle 110 speed to the green speed limit set in step 706.

If the driver is traveling less than or equal to the green speed limit the on-board computer 115 may proceed to step 712. At step 712, the on-board computer 115 may determine if a yellow token value is less than the yellow token limit value for the zone. If so, the on-board computer 115 may proceed to step 714 where the yellow token value may be incremented by the yellow token reward value. As described in reference to FIG. 6, the token system may be used to not penalize good drivers for temporarily speeding.

Once the yellow token value has been incremented, or if the yellow token value is greater than or equal to the yellow token limit, the on-board computer 115 may proceed to step 716 where the on-board computer 115 may determine if a red token value is less than the red token limit value for the zone. If so, the on-board computer 115 may proceed to step 718 where the red token value may be incremented by the red token reward value. Once the red token value has been incremented, or if the red token value is greater than or equal to the red token limit, the on-board computer 115 may proceed to step 720 where the on-board computer 115 may wait a delay period before re-calculating the location of the vehicle 110 at step 703.

Returning to step 710, if the on-board computer 115 determines that the vehicle 110 is traveling at a speed greater than the green speed limit, the on-board computer 115 may determine if the vehicle 110 is traveling at a speed less than or equal to the yellow speed limit. If so, the on-board computer 115 may proceed to step 726. At step 726, the on-board computer 115 may determine if the speed of the vehicle 110 is less than or equal to the yellow token value. This may be true if the vehicle 110 traveled at a speed less than or equal to the green speed limit for a sufficient amount of time to build up the yellow token value. If the vehicle 110 traveled at a speed less than or equal to the green speed limit for some time, the yellow token value may have been incremented by the yellow token reward value.

At step 726, if the driver had in the past built up enough of a yellow token value to be greater than or equal to the vehicle 110's current speed, the on-board computer 115 may proceed to step 730 where the on-board computer 115 may decrease the yellow token value by the current speed of the vehicle 110, according to one embodiment of the invention. However, the amount of decrease of the yellow token value may vary from one embodiment to another. After step 730, the on-board computer 115 may proceed to step 720 where the on-board computer 115 may wait a delay period before re-calculating the location of the vehicle 110 at step 703.

Returning to step 726, if the driver had not built up enough of a yellow token value to be greater than or equal to the current speed of the vehicle 110, the on-board computer 115 may proceed to step 728 where the on-board computer 115 may increase the yellow warning value. The yellow warning value may be a counter, which increments by one the number of times the driver has been in a warning speed type of situation. After step 728, the on-board computer 115 may proceed to step 732 where the on-board computer 115 may determine if the number of yellow warnings is greater than the yellow warning limit. If not, the on-board computer 115 may proceed to step 720 where the on-board computer 115 may wait a predefined period of time before re-calculating the vehicle 110 location at step 703.

If the yellow warning count is greater than the yellow warning limit for the zone, then on-board computer 115 may proceed to step 734 where the on-board computer 115 may report the speeding driver along with any other pertinent information (e.g., vehicle identification, speed traveling, etc.) to the authority agency 125 via the wireless network 120

In another embodiment of the invention, the on-board computer 115 may store the warning information locally within the memory 215 of the on-board computer 115 to be downloaded to an external device physically connected to the on-board computer 115 at a later time. This storing and downloading of the warning information may be in place of immediately reporting the speeding information to the authority agency 125 via the wireless network 120.

After step 734, the on-board computer 115 may reset the yellow warning count to zero at step 736. Next at step 738, the on-board computer 115 may warn the driver of a yellow speed limit violation via any acceptably warning means (e.g., an audible signal). After step 738, the on-board computer 115 may proceed to step 720 where the on-board computer 115 may wait a predefined amount of time before proceeding to step 703.

Returning to step 724, if the vehicle 110 speed is greater than the yellow speed limit the on-board computer 115 may proceed to step 740. At step 740, the on-board computer 115 may determine whether or not the vehicle 110 is traveling at a speed less than or equal to a red speed limit. If so, the on-board computer 115 may proceed to step 742. At step 742, the on-board computer 115 may determine if the speed is less than or equal to the red token value. The only way for this to be true is if the vehicle 110 traveled at a speed less than or equal to the green speed limit for some time. If the vehicle 110 traveled at a speed less than or equal to the green speed limit for some time, the red token value was incremented by the red token reward value in step 718. Now at step 742, if the driver had in the past built up enough of a red token value to be greater than or equal to the speed of the vehicle 110 the on-board computer 115 may proceed to step 744 where the on-board computer 115 may decrease the red token value by the current speed of the vehicle 110. After step 744, the on-board computer 115 may proceed to step 720 where the on-board computer 115 may wait a delay period before re-calculating the location of the vehicle 110 at step 703.

Returning to step 742, if the driver had not built up enough of a red token value to be greater than or equal to the speed of the vehicle 110, the on-board computer 115 may proceed to step 746 where the on-board computer 115 may increase the red warning value. The red warning value, like the yellow warning value, may be a counter, which may be incremented by one each time the driver has been in a warning speed type of situation. After step 746, the on-board computer 115 may proceed to step 748 where the on-board computer 115 may determine if the number of red warnings is greater than the red warning limit. If not, the on-board computer 115 may proceed to step 720 where the on-board computer 115 may wait a predefined period of time before re-calculating the vehicle 110 location at step 703. However, if the red warning count is greater than the red warning limit for the zone, then on-board computer 115 may proceed to step 750 where the on-board computer 115 may report the speeding driver along with any other pertinent information (e.g., vehicle identification, speed traveling, etc.) to the authority agency 125 via the wireless network 120.

After step 750, the on-board computer 115 may reset the red warning count to zero at step 752. Next at step 754, the on-board computer 115 may warn the driver of a red speed limit violation via any acceptably warning means (e.g., an audible signal). After step 754, the on-board computer 115 may proceed to step 720 where the on-board computer 115 may wait a predefined amount of time before proceeding to step 703.

Returning to step 740, if the vehicle 110 is traveling at a speed greater than the red speed limit the on-board computer 115 may proceed to step 756. At step 756, the identification of the speeding driver along with any other pertinent information (e.g., vehicle identification, speed traveling, number of yellow and red warnings) may be sent to the authority agency 125 via the wireless network 120. Step 756 may be performed even if the driver has built up yellow tokens and red tokens in steps 714 and 718 respectively. The tokens may be ignored in this situation because a violation of the red speed limit may present an extremely dangerous situation to both the driver and the surrounding public.

Next at step 758, the on-board computer 115 may reset the number of yellow warnings and the number of red warnings. The on-board computer 115 may then proceed to step 760 where the driver may be informed of the excessively high speed at which the vehicle 110 is traveling. After step 760 the on-board computer 115 may return to step 720 where the on-board computer 115 may wait a predefined amount of time before proceed to step 703.

CONCLUSION

In conclusion the systems, articles of manufacture, and methods which may make up the parametric speed metering system provide an effective way to determine the location and speed of a vehicle and perform actions based on the location and speed of the vehicle. The actions may include, but are not limited to, determining a geographic zone in which the vehicle is traveling, updating speed limits based on the geographic zones, warning a driver that he or she may be violating geographical zone specific speed limits, and reporting speed limit violations to an authority agency.

While the foregoing is directed to embodiments of the present invention, other and further embodiments of the invention may be devised without departing from the basic scope thereof, and the scope thereof is determined by the claims that follow.

What is claimed is:

1. A computer-implemented method for monitoring a speed of a vehicle, the method comprising:

determining a location of the vehicle;

retrieving one or more geographically specific speed-monitoring parameters corresponding to the determined location of the vehicle; wherein the speed-monitoring parameters are retrieved from a database containing a plurality of geographically specific speed-monitoring parameters each corresponding to different geographic locations, and wherein the plurality of speed-monitoring parameters are user-configurable;

determining a speed of the vehicle; and on the basis of the retrieved speed-monitoring parameters and the determined speed of the vehicle, adjusting one or more token values according to a credit/debit system in which the one or more token values are increased if the determined speed is less than a first predefined speed threshold and decreased if the determined speed is greater than the first predetermined speed threshold, and wherein the one or more token values are applied to mitigate a likelihood that an excessive speed warning is issued.

2. The method of claim 1, further comprising downloading to the vehicle an updated database containing the one or more geographically specific speed-monitoring parameters.

3. The method of claim 2, wherein the updated database is downloaded via a wireless network.

4. The method of claim 1, wherein the updated database is downloaded via a Global System for Communications (GSM) network.

5. The method of claim 1, wherein determining the speed of the vehicle is performed periodically at a predefined sample rate.

6. The method of claim 1, wherein adjusting one or more token values according to the credit/debit system, comprises:

increasing a first token value if the determined speed is less than a first predefined threshold and if the first token value is less than a predefined token value limit, wherein the predefined token value limit is one of the retrieved speed-monitoring parameters; and decreasing the first token value if the determined speed is greater than the first predefined threshold and if the determined speed less than the predefined token value limit.

7. The method of claim 6, wherein the first token value is incremented by a predefined reward value which is one of the retrieved speed-monitoring parameters.

8. The method of claim 1 wherein the location of the vehicle is determined using a Global Positioning System (GPS).

9. A computer-implemented method for monitoring a speed of a vehicle, the method comprising:

determining a location of the vehicle;

retrieving one or more geographically specific speed-monitoring parameters corresponding to the determined location of the vehicle; wherein the speed-monitoring parameters are retrieved from a database containing a plurality of geographically specific speed-monitoring parameters each corresponding to different geographic locations, and wherein the plurality of speed-monitoring parameters are user-configurable;

determining a speed of the vehicle; and on the basis of the retrieved speed-monitoring parameters and the determined speed of the vehicle:

increasing one or more token values each corresponding to a distinct speed range if the determined speed is less than a first predefined threshold and if each token value is less than a predefined token value limit for the respective token, wherein the predefined token value limits are included with the retrieved speed-monitoring parameters;

decreasing the token value corresponding to the distinct speed range if the determined speed is within the distinct speed range and the token value is greater than the determined speed of the vehicle;

increasing one or more warning values corresponding to the distinct speed range if the respective token value is less than the determined speed of the vehicle; and issuing a notification if the one or more warning values are greater than one or more predefined warning value limits, wherein the predefined warning value limits are included with the retrieved speed-monitoring parameters.

10. The method of claim 9, further comprising issuing a notification if the determined speed of the vehicle is greater than a predefined threshold.

11. The method of claim 9, wherein issuing a notification comprises sending a wireless transmission to an authority agency on a wireless network.

12. The method of claim 9, wherein issuing a notification comprises sending an alert to a driver of the vehicle.

13. The method of claim 12, wherein the alert to the driver comprises at least one of an audible signal and a visual signal.

14. The method of claim 9, wherein retrieving one or more geographically specific speed monitoring parameters comprises downloading to the vehicle, via a wireless network connection, the one or more geographically specific speed-monitoring parameters.

15. The method of claim 9, wherein the token value is decreased by an amount relative to the determined speed of the vehicle.

16. The method of claim 9, wherein determining the speed of the vehicle is performed periodically at a predefined sample rate.

* * * * *